United States Patent
Miyoshi et al.

(10) Patent No.: US 9,395,986 B2
(45) Date of Patent: Jul. 19, 2016

(54) COMPILING METHOD AND COMPILING APPARATUS

(71) Applicant: FUJITSU LIMITED, Kawasaki-shi, Kanagawa (JP)

(72) Inventors: Takahiro Miyoshi, Numazu (JP); Shuichi Chiba, Numazu (JP); Tomoko Nikko, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/662,648

(22) Filed: Mar. 19, 2015

(65) Prior Publication Data

US 2015/0293768 A1     Oct. 15, 2015

(30) Foreign Application Priority Data

Apr. 10, 2014   (JP) .................................. 2014-080869

(51) Int. Cl.
  *G06F 9/45*         (2006.01)
  *G06F 9/30*         (2006.01)

(52) U.S. Cl.
  CPC .............. *G06F 9/30058* (2013.01); *G06F 8/41* (2013.01)

(58) Field of Classification Search
  None
  See application file for complete search history.

(56) References Cited

U.S. PATENT DOCUMENTS

| 6,662,294 B1 * | 12/2003 | Kahle ................. | G06F 9/30174 712/226 |
| 8,667,476 B1 * | 3/2014 | Jung .................... | G06F 9/30145 717/140 |
| 2008/0162903 A1 * | 7/2008 | Yamazaki .............. | G06F 9/322 712/233 |
| 2010/0205585 A1 | 8/2010 | McAllister et al. | |
| 2010/0262813 A1 * | 10/2010 | Brown .................... | G06F 8/433 712/240 |

FOREIGN PATENT DOCUMENTS

| JP | 2003-202991 | 7/2003 |
| JP | 2010-186467 | 8/2010 |

OTHER PUBLICATIONS

Patent Abstracts of Japan, Publication No. 2003-202991, published Jul. 18, 2003.
Patent Abstracts of Japan, Publication No. 2010-186467, published Aug. 26, 2010.

* cited by examiner

*Primary Examiner* — Insun Kang
(74) *Attorney, Agent, or Firm* — Staas & Halsey LLP

(57) ABSTRACT

A compiling apparatus detects a plurality of branch instructions, each of which specifies execution of branch processing on the basis of a result of a comparison operation between integers and indicates the same jump destination, in a first code. The compiling apparatus converts the plurality of branch instructions into an instruction group having fewer branch instructions than the plurality of branch instructions by using logical and arithmetic instructions. The compiling apparatus generates a second code using the converted instruction group when the number of cycles of processing based on the converted instruction group is smaller than that based on the plurality of branch instructions.

5 Claims, 17 Drawing Sheets

PROCESSOR INFORMATION

144

| INSTRUCTION FORMAT | CYCLE NUMBER | OPERATION CONTENT |
|---|---|---|
| cmp A, B | 1 | zero=ON (if A=B) |
| beq label | 10 | goto label (if zero=ON) |
| bne label | 10 | goto label (if zero=OFF) |
| addx A, B, C | 1 | C=A+B+carry |
| subx A, B, C | 1 | C=A−B−carry |
| subcc A, B, C | 1 | C=A−B; carry=ON (if A<B); zero=ON (if C=0) |
| xor A, B, C | 1 | C=AxorB |
| andcc A, B, C | 1 | C=AandB; zero=ON (if C=0) |
| orcc A, B, C | 1 | C=AorB; zero=ON (if C=0) |

FIG. 5

COMPARISON VALUE ARRAY ─148

| INDEX | COMPARISON VALUE |
|---|---|
| 0 | 10 |
| 1 | 32 |
| 2 | 9 |
| 3 | 13 |
| 4 | 34 |
| 5 | 39 |
| 6 | 47 |
| 7 | 59 |
| 8 | 123 |
| 9 | 125 |

FIG. 15

EXECUTION INFORMATION 149

| COMPARISON VALUE | NUMBER OF JUMPS | RATE |
|---|---|---|
| 10 | 30 | 1.5 |
| 32 | 50 | 2.5 |
| 9 | 420 | 21.0 |
| 13 | 100 | 5.0 |
| 34 | 60 | 3.0 |
| 39 | 380 | 19.0 |
| 47 | 440 | 22.0 |
| 59 | 110 | 5.5 |
| 123 | 390 | 19.5 |
| 125 | 20 | 1.0 |

FIG. 16

COMPILING METHOD AND COMPILING APPARATUS

CROSS-REFERENCE TO RELATED APPLICATION

This application is based upon and claims the benefit of priority of the prior Japanese Patent Application No. 2014-080869, filed on Apr. 10, 2014, the entire contents of which are incorporated herein by reference.

FIELD

The embodiments discussed herein relate to a compiling method and a compiling apparatus.

BACKGROUND

At present, a pipeline processing technique is used in many computer processors. In this technique, processing of an instruction is divided into a plurality of stages such as "Fetch," "Decode," "Execute," and "Memory access" so that processing in these different stages is executed in parallel. Namely, while a certain instruction is being processed in a certain stage (for example, in the Fetch stage), another instruction is processed in another stage (for example, in the Decode stage) in parallel.

Ideally, it is preferable that more instructions be executed in the pipeline processing so that processing is constantly executed in all the stages. However, various reasons could create idle stages and decrease the utilization rate of the pipeline processing. For example, the utilization rate is decreased when a program includes a branch instruction representing conditional branching. When a branch instruction is executed, depending on the execution result thereof, either the instruction of the next address is selected without executing a jump (not-taken) or the instruction of a distant address is selected by executing a jump (taken). The next instruction to be executed after a branch instruction is not determined until the branch instruction is processed through the "Execute" stage. If feeding the next instruction into the pipeline processing is halted until the execution result of the branch instruction is obtained, at least one idle stage is created.

In addition, some processors adopt a branch prediction technique. In the branch prediction, a branch prediction circuit arranged as a hardware module in a processor collects history information that indicates the execution results of the past branch instructions. When the processor executes any one of these branch instructions next, the branch prediction circuit predicts a branch direction for this branch instruction (taken or not-taken) on the basis of the history information. The processor selects and feeds the next instruction into the pipeline processing on the basis of the prediction made by the branch prediction circuit, without waiting for the execution result of the current branch instruction being processed in the pipeline processing (speculative execution).

If the branch prediction succeeds, the processor simply proceeds with the pipeline processing. Thus, creation of an idle stage is prevented. However, if the branch prediction fails, the processor needs to delete the instruction and the subsequent instructions fed on the basis of the prediction from the pipeline processing. The processor needs to feed an appropriate instruction, instead. Namely, there is a penalty for a prediction error. Consequently, even if the branch prediction technique is adopted, when a program including many branch instructions is executed, the utilization rate of the pipeline processing could be decreased. Thus, the execution efficiency of the program could be decreased.

In such circumstance, there have been proposed techniques for obtaining a program having fewer branch instructions through conversion in an optimizing compiler. For example, assuming that a source code includes an if-else statement defining: if c is true, a value t is assigned to a variable v; and if c is false, a value f is assigned to a variable v, a compiler according to one proposed technique converts the if-else statement into the following assignment statement: v=(t and c) or (f and not c).

In addition, assuming that a source code includes an if-else statement defining that result=5*data or result=7*data is executed on the basis of a mask bit string "mask," a compiler according to another proposed technique converts the if-else statement into the following assignment statement: result= (5*data and mask) or (7*data andc mask). Namely, the compiler generates a program defining that: both instructions in the if clause and the else clause are executed; AND of the execution result of the if clause and the mask bit string and ANDC of the execution result of the else clause and the mask bit string are each calculated; and the results of the both calculations are combined by OR.

See, for example, the following documents: Japanese Laid-open Patent Publication No. 2003-202991 Japanese Laid-open Patent Publication No. 2010-186467

For example, in one type of branch structure, a program includes consecutive branch instructions, each of which indicates the same jump destination and causes a processor to determine a branch direction on the basis of a result of a comparison operation between integers. For example, there is a program defining that certain processing is executed if a variable c matches any one of constants $c_1$, $c_2$, etc. Characters are represented by integers in character mode in computers. Therefore, a processor executes a program defining that certain processing is executed if a value of a character variable s matches any one of constant $s_1$, $s_2$, etc. in the same way as a comparison operation between integers.

It is possible to cause an optimizing compiler to convert such a branch instruction group into an instruction group having fewer branch instructions. However, if a branch instruction group is converted into an instruction group, the number of instructions obtained could significantly be increased by the conversion. Thus, conventional optimizing compilers do not convert such a branch instruction group as described above into an instruction group having fewer branch instructions. In addition, whether a branch instruction group is converted into an instruction group having a higher execution efficiency depends on the architecture of the processor (target processor) that executes the program.

SUMMARY

According to one aspect, there is provided a non-transitory computer-readable recording medium storing a computer program that causes a computer to perform a procedure including: detecting a plurality of branch instructions, each of which specifies execution of branch processing on the basis of a result of a comparison operation between integers and indicates the same jump destination, in a first code; converting the plurality of branch instructions into an instruction group having fewer branch instructions than the plurality of branch instructions by using logical and arithmetic instructions; and generating a second code using the converted instruction group when the number of cycles of processing based on the converted instruction group is smaller than that based on the plurality of branch instructions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an exemplary table illustrating processor information;

FIG. 15 is an exemplary table illustrating a comparison value array;

FIG. 16 is an exemplary table illustrating execution information; and

DESCRIPTION OF EMBODIMENTS

Hereinafter, embodiments will be described below with reference to the accompanying drawings.

First Embodiment

Figure 1:
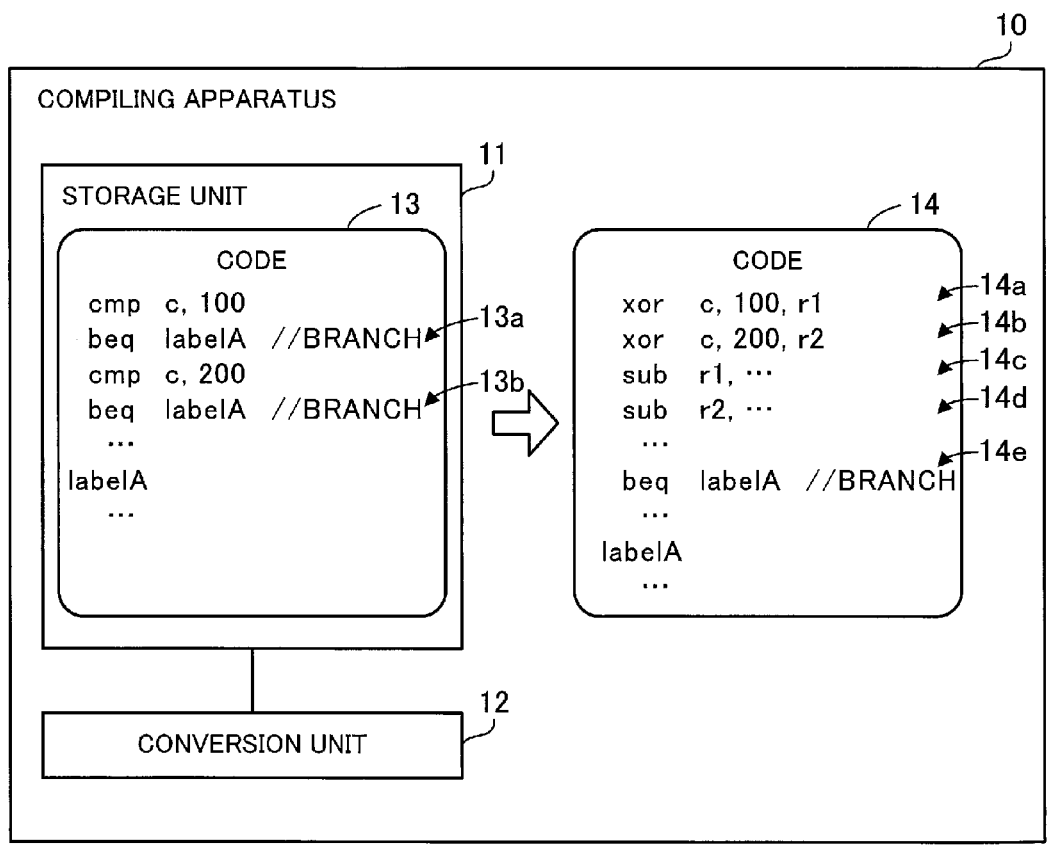
FIG. 1 illustrates a compiling apparatus according to a first embodiment.

FIG. 1 illustrates a compiling apparatus 10 according to a first embodiment.

When appropriate, the compiling apparatus 10 according to the first embodiment converts a code 13 into a code 14 having fewer branch instructions than those in the code 13 as optimization processing. Each of the codes 13 and 14 includes instructions to be executed by a processor and may be referred to as a program. The code 13 may be a source code written in a high level language or may be an intermediate code obtained by conversion of a source code. The code 14 may be an optimized intermediate code, an assembly code, or a machine-readable object code. In addition, the compiling apparatus 10 may be a terminal apparatus controlled by a user or a server apparatus accessed by a terminal apparatus. The compiling apparatus 10 may be implemented by using a computer or an information processing apparatus.

The compiling apparatus 10 includes a storage unit 11 and a conversion unit 12. The code 13 is stored in the storage unit 11. The storage unit 11 may be a volatile storage device such as a random access memory (RAM) or a non-volatile storage device such as a hard disk drive (HDD). The conversion unit 12 converts the code 13 stored in the storage unit 11 into the code 14, when appropriate. The conversion unit 12 may be a processor such as a central processing unit (CPU) or a digital signal processor (DSP). The conversion unit 12 may include an electronic circuit for a particular purpose such as an application specific integrated circuit (ASIC) and a field programmable gate array (FPGA). The processor executes, for example, a compiler program stored in the storage unit 11 or another storage apparatus. In addition, a group of processors (multiprocessors) may be referred to as the "processor."

The conversion unit 12 detects a plurality of branch instructions that satisfy predetermined conditions in the code 13 stored in the storage unit 11. One of the predetermined conditions is that a plurality of branch instructions indicate the same jump destination. In addition, another one of the predetermined conditions is that each of the branch instructions is a conditional branch instruction that causes the processor to execute branch processing on the basis of a result of a comparison operation between integers.

For example, the comparison operation between integers is an operation for determining whether an input value such as a variable matches a fixed integer. In this case, branch processing executed on the basis of a result of the comparison operation is to jump if the input value matches or does not match the fixed integer, for example. The same value may be used as the input value among the plurality of branch instructions. A different value may be used as the fixed integer per branch instruction. In addition, the variable may be a character variable. Namely, the input value and the fixed integer may be character codes representing characters.

In the example in FIG. 1, the code 13 includes a branch instruction 13a in which whether to jump to a label A is determined on the basis of a comparison between a variable c and a fixed integer "100" and a branch instruction 13b in which whether to jump to the label A is determined on the basis of a comparison between a variable c and a fixed integer "200." Thus, the conversion unit 12 detects the branch instructions 13a and 13b in the code 13.

The conversion unit 12 converts the detected branch instructions into a converted instruction group having fewer branch instructions than the detected branch instructions by using logical and arithmetic instructions. The logical instructions used in the converted instruction group may include a logical OR instruction (OR), a logical AND instruction (AND), and an exclusive OR instruction (XOR). The arithmetic instructions used in the converted instruction group may include an addition instruction (ADD) and a subtraction instruction (SUB). In addition, the logical and arithmetic instructions used in the converted instruction group may include processor-architecture-dependent instructions that cause the processor to execute operations using status register flags such as a carry flag and a zero flag.

In the example in FIG. 1, a converted instruction group including logical instructions 14a and 14b, arithmetic instructions 14c and 14d, and a branch instruction 14e is generated from the code 13. In this converted instruction group, a value representing whether the variable c matches the fixed integer "100" and a value representing whether the variable c matches the fixed integer "200" are calculated by using the logical instructions 14a and 14b, respectively. In addition, a determination value representing whether the variable c matches "100" or "200" is calculated on the basis of the operation results of the logical instructions 14a and 14b by using the arithmetic instructions 14c and 14d. Next, in the branch instruction 14e, whether to jump to the label A is determined on the basis of the determination value. Namely, two determination operations for determining whether to jump to the label A are combined into one operation. Thus, the number of branch instructions is reduced.

If the number of cycles of the processing executed on the basis of the converted instruction group is smaller than the number of cycles of the processing executed on the basis of the original branch instructions, the conversion unit 12 generates the code 14 using the converted instruction group. For example, the conversion unit 12 refers to processor information that indicates the number of cycles needed when a target processor executes an instruction and predicts the number of cycles needed when branch processing is executed in accordance with the converted instruction group. Likewise, by referring to the processor information, the conversion unit 12 predicts the number of cycles needed when branch processing is executed in accordance with the original branch instructions. Next, for example, the conversion unit 12 compares the number of cycles needed for the original branch instructions with that needed for the converted instruction group. If the latter is smaller than the former (namely, if the number of cycles is predicted to be decreased by the conversion), the conversion unit 12 adopts the converted instruction group.

The compiling apparatus 10 according to the first embodiment detects the branch instructions 13a and 13b each of which specifies execution of branch processing on the basis of a result of a comparison operation between integers and indicates the same jump destination. The compiling apparatus 10 converts the detected branch instructions 13a and 13b into an instruction group having fewer branch instructions by using logical and arithmetic instructions. If the number of cycles of processing based on the converted instruction group is smaller than that based on the branch instructions 13a and 13b, the compiling apparatus 10 generates the code 14 using the converted instruction group.

In this way, the number of branch instructions included in the object code is reduced. Thus, the wait time during pipeline processing is reduced, and the object code execution efficiency is improved. In particular, processors that are less accurate in branch prediction achieve a significant improvement in their execution efficiency by reducing the number of branch instructions. In addition, since consecutive branch instructions indicating the same jump destination are converted, the execution efficiency of the processing that is easily and significantly affected by the wait time for a next instruction to be fed or a branch prediction error is improved. In addition, as described above, the conversion unit 12 determines whether the cycle number is reduced by a conversion. Thus, even if the conversion increases the number of instructions or an instruction needing a different number of cycles depending on a processor is used, an object code having a higher execution efficiency is generated.

Second Embodiment

A compiling apparatus 100 according to a second embodiment compiles a source code written in a high level language and generates a machine-readable object code. The compiling apparatus 100 may be a terminal apparatus operated by a user or a server apparatus accessed by a terminal apparatus. The compiling apparatus 100 may be implemented by using a computer, for example. In such case, the compiling apparatus 100 executes a compiler and a linker as software programs.

Figure 2:
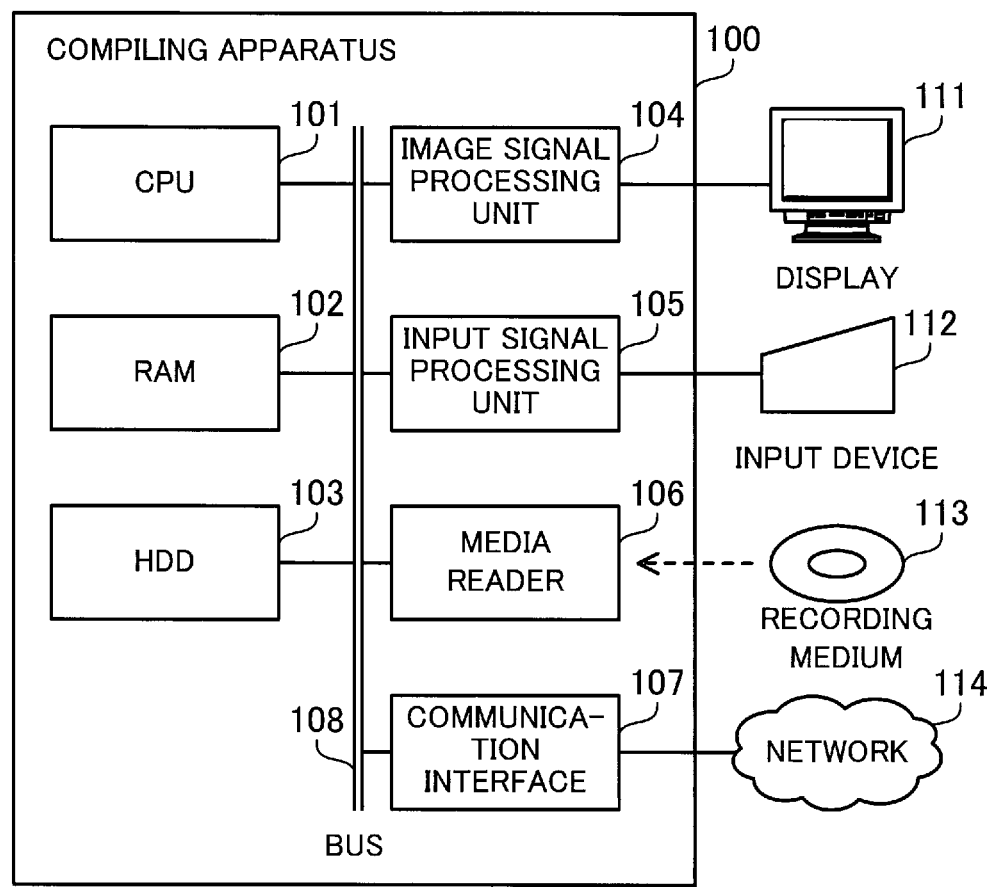
FIG. 2 is a block diagram illustrating an exemplary hardware configuration of a compiling apparatus.

FIG. 2 is a block diagram illustrating an exemplary hardware configuration of the compiling apparatus 100.

The compiling apparatus 100 includes a central processing unit (CPU) 101, a random access memory (RAM) 102, a hard disk drive (HDD) 103, an image signal processing unit 104, an input signal processing unit 105, a media reader 106, and a communication interface 107. The above units are connected to a bus 108. The CPU 101 and the RAM 102 are examples of the conversion unit 12 and the storage unit 11 in the first embodiment, respectively.

The CPU 101 is a processor that includes an operational circuit configured to execute instructions in a program. The CPU 101 loads at least a part of the program or data stored in the HDD 103 to the RAM 102 and executes the program. In addition, the CPU 101 may include a plurality of processor cores. The compiling apparatus 100 may include a plurality of processors. Processing described below may be executed in parallel by using a plurality of processor cores or processors. In addition, a group of processors (multiprocessors) may be referred to as the "processor."

The RAM 102 is a volatile semiconductor memory in which programs executed by the CPU 101 and data used for operations by the CPU 101 are temporarily stored. The compiling apparatus 100 may include a different type of memory other than a RAM. The compiling apparatus 100 may include a plurality of memories.

The HDD 103 is a non-volatile storage device in which an operating system (OS), middleware, software programs such as application software, and data are stored. The programs include a compiler program and a link program. The compiling apparatus 100 may include other types of storage device such as a flash memory and a solid state drive (SSD) and may include a plurality of non-volatile storage devices.

The image signal processing unit 104 outputs images to a display 111 connected to the compiling apparatus 100 in accordance with instructions from the CPU 101. Examples of the display 111 include a cathode ray tube (CRT) display, a liquid crystal display (LCD), a plasma display panel (PDP), and an organic electro-luminescence (OEL) display.

The input signal processing unit 105 receives input signals from an input device 112 connected to the compiling apparatus 100 and outputs the received signals to the CPU 101. Examples of the input device 112 include a pointing device such as a mouse, a touch panel, a touch pad, and a trackball, a key board, a remote controller, and button switches. In addition, a plurality of types of input device may be connected to the compiling apparatus 100.

The media reader 106 reads programs and data stored in a recording medium 113. Examples of the recording medium 113 include a magnetic disk such as a flexible disk (FD) and an HDD, an optical disc such as a compact disc (CD) and a digital versatile disc (DVD), a magneto-optical disk (MO), and a semiconductor memory. For example, the media reader 106 stores programs and data read from the recording medium 113 in the RAM 102 or the HDD 103.

The communication interface 107 is connected to a network 114 and communicates with other computers via the network 114. The communication interface 107 may be a wired communication interface connected to a communication device such as a switch via a cable or may be a wireless communication interface connected to a base station via a wireless link.

The compiling apparatus 100 may be configured without the media reader 106. In addition, if a user is capable of controlling the compiling apparatus 100 by operating a terminal apparatus, the compiling apparatus 100 may be configured without the image signal processing unit 104 and the input signal processing unit 105. In addition, the display 111 and the input device 112 may be integrated with the housing of the compiling apparatus 100.

Figure 3:
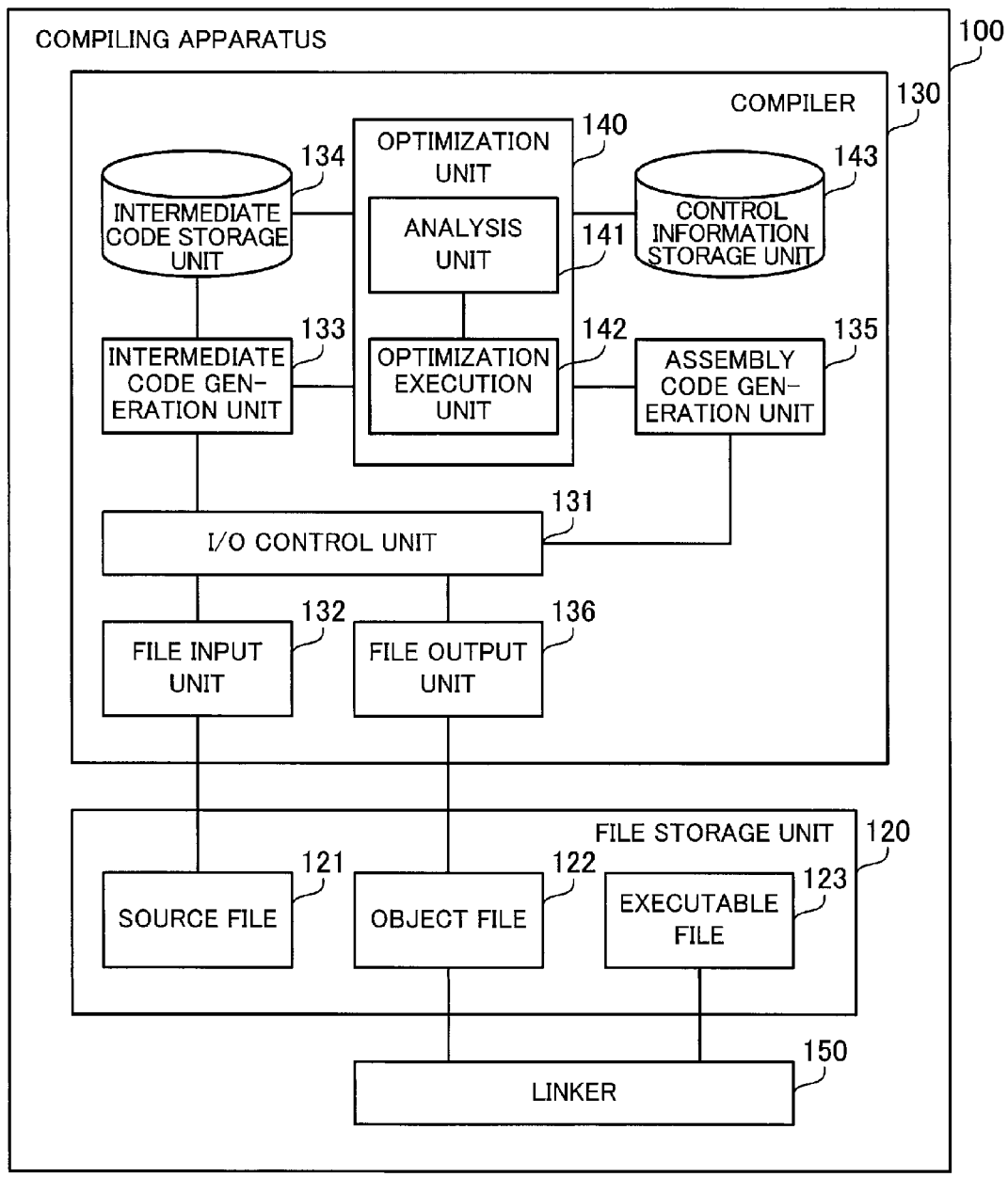
FIG. 3 is a block diagram illustrating exemplary functions of the compiling apparatus.

FIG. 3 is a block diagram illustrating exemplary functions of the compiling apparatus 100.

The compiling apparatus 100 includes a file storage unit 120, a compiler 130, and a linker 150. For example, the file storage unit 120 is realized as a storage area in the RAM 102 or the HDD 103. For example, the compiler 130 and the linker 150 are realized as program modules (a compiler program and a link program) executed by the CPU 101, respectively. Alternatively, at least a part of the functions of the compiler 130 and the linker 150 may be realized as an electronic circuit rather than a software program.

A source file 121, an object file 122, and an executable file 123 are stored in the file storage 120. The source file 121 includes a source code written in a high level language. The object file 122 includes a machine-readable object code. The executable file 123 is a file in a format that is executable by a target processor and includes links to generated object code and libraries, for example. The executable file 123 may be executed by the CPU 101, another CPU included in the compiling apparatus 100, or a CPU included in a computer other than the compiling apparatus 100.

The compiler 130 reads the source file 121 in the file storage unit 120, converts a source code in the source file 121 into an object code, and stores the object file 122 including the object code in the file storage unit 120. The compiler 130 includes an input and output (I/O) control unit 131, a file input unit 132, an intermediate code generation unit 133, an intermediate code storage unit 134, an assembly code generation unit 135, a file output unit 136, an optimization unit 140, and a control information storage unit 143.

The I/O control unit 131 selects an appropriate input and output method on the basis of a file type and controls the file input unit 132 and the file output unit 136. The file input unit 132 opens the source file 121 and reads a source code in the source file 121 in accordance with an instruction from the I/O control unit 131. The intermediate code generation unit 133 analyzes the source code read by the file input unit 132, converts the source code into an intermediate code written in an intermediate language that is used in the compiler 130, and stores the intermediate code in the intermediate code storage unit 134. Examples of the analysis of the source code include a lexical analysis, a syntax analysis, and a semantic analysis. The intermediate code storage unit 134 is a storage area in the RAM 102 and stores the intermediate code.

The assembly code generation unit 135 converts the intermediate code optimized by the optimization unit 140 into an assembly code written in assembly language, which is a low level language. The file output unit 136 generates the object file 122 in accordance with an instruction from the I/O control unit 131, converts the assembly code generated by the assembly code generation unit 135 into an object code, and writes the object code in the object file 122.

The optimization unit 140 optimizes the intermediate code stored in the intermediate code storage unit 134 to improve the execution speed. The optimization unit 140 includes an analysis unit 141 and an optimization execution unit 142. The analysis unit 141 analyzes the intermediate code and determines an optimization method. The determination of an optimization method by the analysis unit 141 includes the determination of whether to reduce the number of branch instructions. Namely, the analysis unit 141 determines whether to convert a group of branch instructions satisfying predetermined conditions into an instruction group having fewer branch instructions. The optimization execution unit 142 optimizes the intermediate code in accordance with the optimization method determined by the analysis unit 141. The optimization executed by the optimization execution unit 142 includes reduction of the number of branch instructions.

The control information storage unit 143 is a storage area in the RAM 102 or the HDD 103. Control information is stored in the control information storage unit 143, and the optimization unit 140 refers to the control information when executing optimization processing. The control information includes processor information that indicates processor-interpretable instructions and the number of cycles needed for each instruction, for example. In addition, processor information about a plurality of types of processor may be stored in the control information storage unit 143. In such case, when a user specifies a type of target processor, the optimization unit 140 refers to processor information corresponding to the specified type. The control information also includes conversion rules used in the optimization for reducing the number of branch instructions.

The linker 150 reads the object file 122 in the file storage unit 120, analyzes an object code, and detects another object file or a library being referred to. Next, the linker 150 links the object file 122 to the detected object file or library and generates the executable file 123. Alternatively, the functions of the linker 150 may be integrated in the compiler 130.

Figure 4:
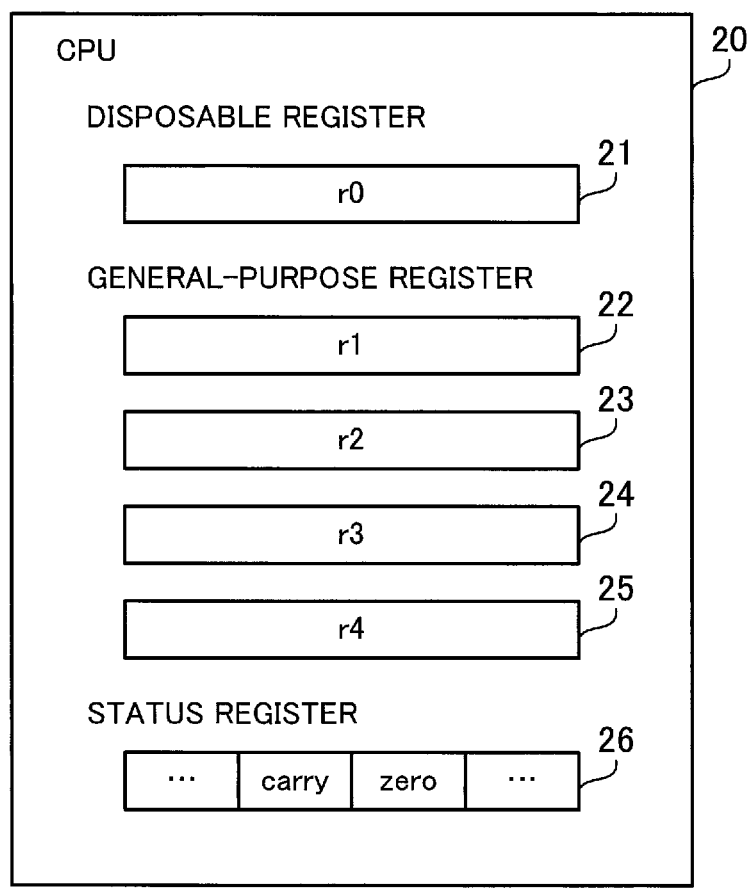
FIG. 4 illustrates exemplary configurations of registers in a processor.

FIG. 4 illustrates exemplary configurations of registers in a processor.

A CPU 20 is a processor capable of executing the executable file 123 generated by the compiling apparatus 100. The CPU 20 includes a disposable register 21 (hereinafter, also referred to as a register r0 as needed), general-purpose registers 22 to 25 (hereinafter, also referred to as registers r1, r2, r3, and r4 as needed), and a status register 26.

The disposable register 21 is a register used as a storage destination in which data which will not be referred to later is stored. Execution of an instruction in which the disposable register 21 is specified as the storage destination of data means discarding of the data.

The disposable register 21 is not necessarily a physical register. Namely, the disposable register 21 may be a virtual register, which does not physically exist. In such case, if the CPU 20 executes an instruction in which the disposable register 21 is specified as the storage destination of data, the CPU 20 immediately discards the data without storing the data in any of the registers.

Each of the general-purpose registers 22 to 25 is a register in which data is temporarily stored. Any one of the general-purpose registers 22 to 25 is explicitly specified in an instruction included in the executable file 123. The status register 26 is a register automatically updated by the CPU 20 on the basis of execution statuses of operations. The status register 26 is not explicitly specified in an instruction included in the executable file 123. Control flags such as a carry flag (carry) and a zero flag (zero) are stored in the status register 26.

The carry flag indicates whether an overflow or a borrow has occurred as a result of a previous operation. If an overflow or a borrow has occurred, the CPU 20 sets the carry flag to ON (1). Otherwise, the CPU 20 sets the carry flag to OFF (0). The zero flag indicates whether the result of a previous operation is zero. If the result of the previous operation is zero, the CPU 20 sets the zero flag to ON (1). Otherwise, the CPU 20 sets the zero flag to OFF (0).

FIG. 5 is an exemplary table illustrating processor information 144.

The processor information 144 is stored in the control information storage unit 143 and includes columns for "Instruction format," "Cycle number" and "Operation content." In an entry under the column "Instruction format," an assembly-language-level instruction and operands are indicated. In an entry under the column "Cycle number," execution time needed by the CPU 20 to execute a corresponding instruction is indicated. In an entry under the column "Operation content," the meaning of a corresponding instruction is indicated. The second embodiment assumes that the CPU 20 capable of executing at least the instructions listed in the processor information 144 in FIG. 5 generates the executable file 123.

The CPU 20 executes instructions cmp, beq, bne, addx, subx, subcc, xor, andcc, and orcc. For the instructions beq and bne, 10 cycles are needed, and for the other instructions, 1 cycle is needed. The instruction cmp is a comparison instruction. If values of operands A and B match, the CPU 20 sets the zero flag to ON. The instruction beq is a branch instruction. If the zero flag is ON, the processing jumps to a label. The instruction bne is a branch instruction. If the zero flag is OFF, the processing jumps to a label. The number of cycles needed for the above branch instructions (the instructions beq and bne) is the number of cycles needed when the CPU 20 does not execute branch prediction or the CPU 20 fails in branch prediction.

The instruction addx is an arithmetic instruction. According to this instruction, B is added to A, and if the carry flag is ON, another 1 is added. The ON of the carry flag is equivalent to a numeric value "1," and the OFF of the carry flag is equivalent to a numeric value "0." The instruction subx is an arithmetic instruction. According to this instruction, B is subtracted from A, and if the carry flag is ON, another 1 is subtracted. The instruction subcc is an arithmetic instruction. According to this instruction, B is subtracted from A. If the instruction subcc is executed and A<B, a borrow occurs. Thus, the CPU 20 sets the carry flag to ON. In addition, if an operation result is 0, the CPU 20 sets the zero flag to ON.

The instruction xor is a logical instruction for calculating the logical OR of operands A and B. The instruction andcc is a logical instruction for calculating the logical AND of operands A and B. If the instruction andcc is executed and every bit in the operation result is 0, the CPU 20 sets the zero flag to ON. The instruction orcc is a logical instruction for calculating the logical OR of operands A and B. If the instruction orcc is executed and every bit in the operation result is 0, the CPU 20 sets the zero flag to ON. The instructions addx, subx, subcc, andcc, and orcc are processor-architecture-dependent instructions that refer to or update the status register.

Next, optimization processing for reducing the number of branch instructions will be described.

Figure 6:
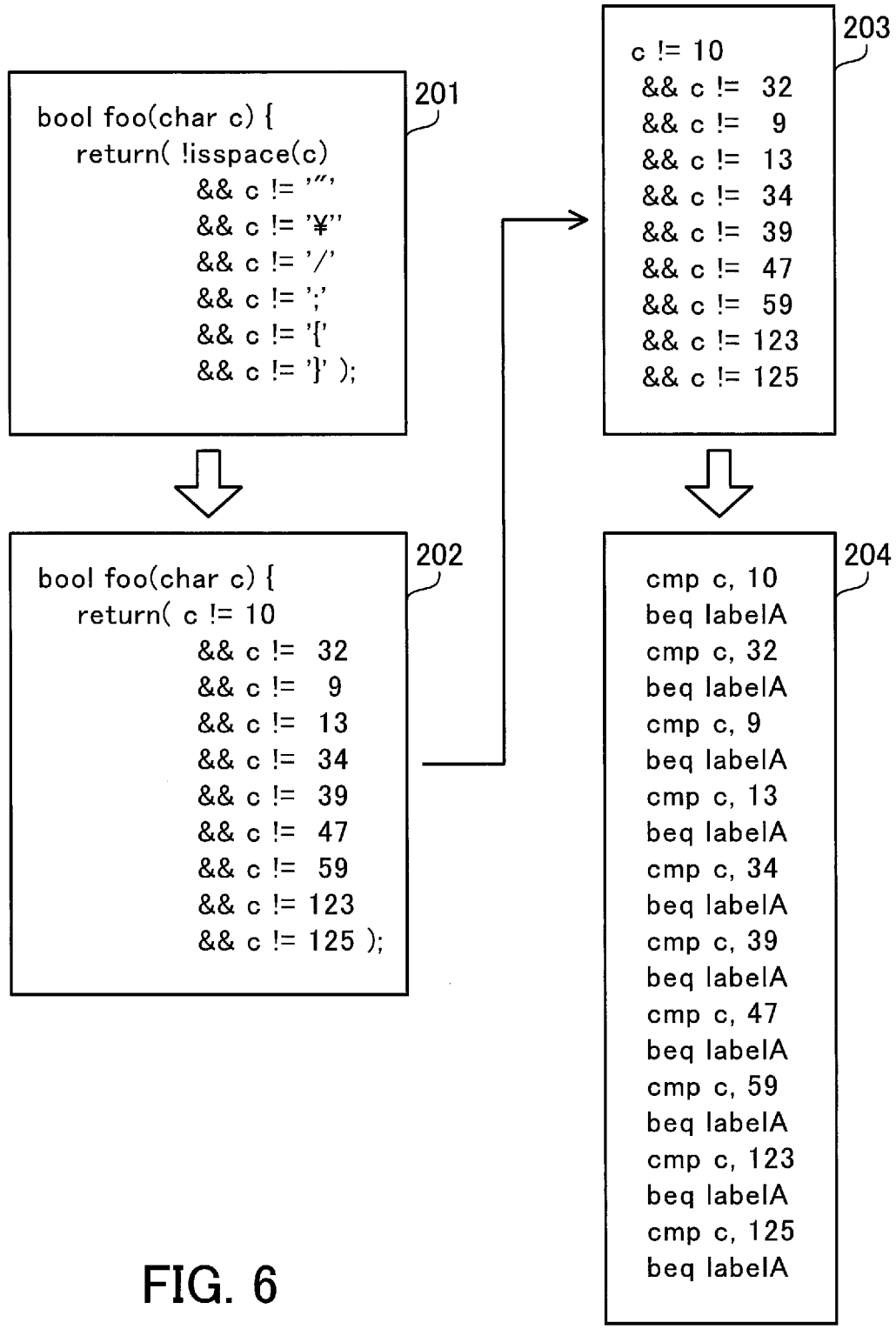
FIG. 6 illustrates exemplary codes including consecutive branch instructions.

FIG. 6 illustrates exemplary codes including consecutive branch instructions.

In source code analysis, the compiling apparatus 100 converts a code 201 into a code 202. In addition, in optimization for reducing the number of branch instructions, the compiling apparatus 100 extracts a code 203 from the code 202 and generates a code 204 from the code 203. In FIG. 6, the code 201 is written in a source code format. While the optimization for reducing the number of branch instructions is executed on an intermediate code, the codes 202 and 203 are also written in a source code format to facilitate understanding of the embodiment. The code 204 is written in an assembly code format or a pseudo assembly code format of an instruction level supported by the CPU 20.

In the code 201, a function foo in which an argument is a character and a return value is a truth value is defined. In the function foo, if a variable c matches any one of a space group and "''," "'," "/," ";," "{," and "}" false is returned. Otherwise, true is returned. In the code 201 illustrated in FIG. 6, since "'" is a special character indicating the start or the end of a character constant, "¥'" is written as an escape sequence.

In the code 202, the same function foo as that in the code 201 is defined. However, in the code 202, comparison values to be compared with the variable c are replaced by integers 10, 32, 9, 13, 34, 39, 47, 59, 123, and 125 corresponding to the character codes. The integer 10 represents a line feed (LF), which indicates the end of a line, the integer 32 represents a space (SP), the integer 9 represents a tab (HT), and the integer 13 represents a carriage return (CR), which also indicates the end of a line. These four integers correspond to the space group in the code 201. The integers 34, 39, 47, 59, 123, and 125 represent "''," "'," "/," ";," "{," and "}," respectively. In a computer, the variable c is treated as an integer that corresponds to a character code. Thus, the code 202 illustrates comparisons between the variable c and the 10 integers.

The code 203 is obtained by extracting the code portion satisfying predetermined conditions from the code 202. In this embodiment, the code portion satisfying predetermined conditions includes a plurality of comparison operations each of which compares a common variable with a fixed integer. If any one of the comparison results does not represent "match" (or if any one of the comparison results represents "match"), common processing is performed. In the code 203, an overall truth value is determined by the results of ten comparison operations. The variable c is compared with 10, 32, 9, 13, 34, 39, 47, 59, 123, and 125 in this order. If the variable c matches any one of the fixed integers, an overall truth value is determined to be false. Thus, the subsequent comparison operations are omitted.

The processing of the code 203 is represented in the code 204 by using instructions cmp (comparison instructions) and instructions beq (branch instructions) supported by the CPU 20. The code 204 includes ten instructions cmp and ten instructions beq. First, an instruction cmp for executing the comparison between the variable c and 10 is executed. If the comparison result is "match" (if zero=ON), an instruction beq for jumping to a label A is executed. For example, the jump destination represented by the label A indicates an instruction for setting the return value of the function foo to false. If c is not 10, another instruction cmp for executing the comparison between the variable c and 32 is executed. If the comparison result is "match," an instruction beq for jumping to the label A is executed. Thereafter, an instruction cmp for executing the comparison between the variable c and each of the rest of the fixed integers and an instruction beq for jumping to the label A are alternately executed.

Figure 7:
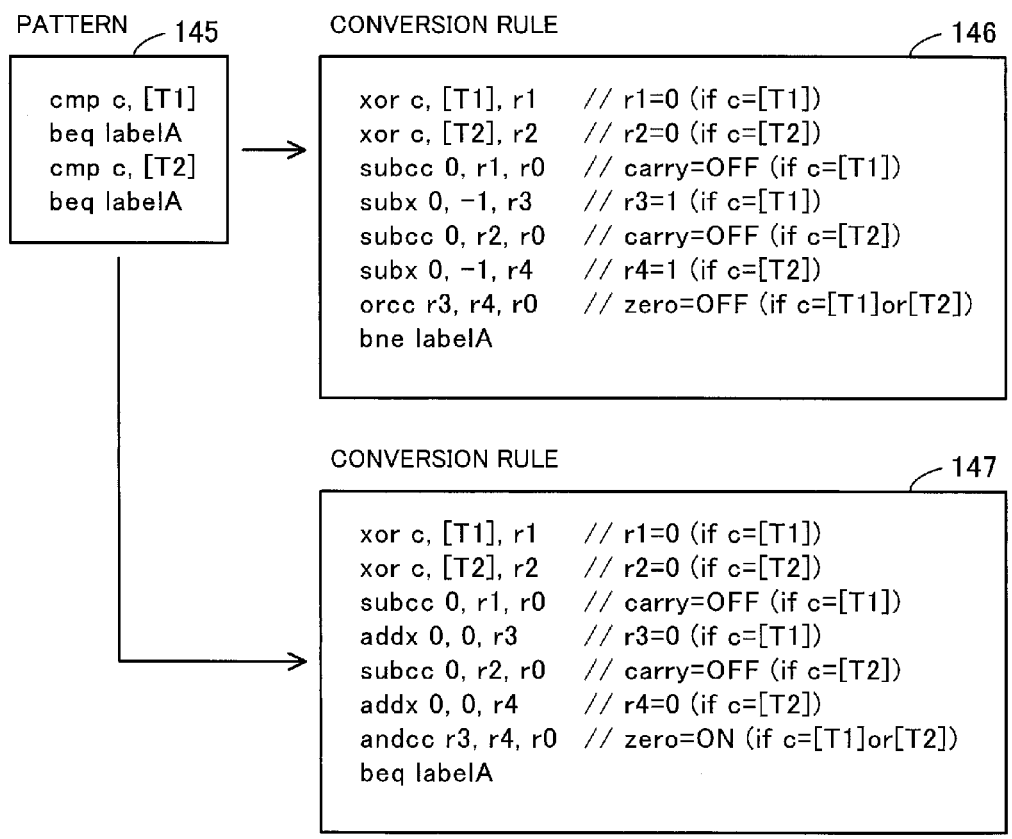
FIG. 7 illustrates an exemplary code pattern and conversion rules.

FIG. 7 illustrates an exemplary code pattern and conversion rules.

After the conversions in FIG. 6 have been completed, the compiling apparatus 100 converts a code corresponding to a pattern 145 into a code having fewer branch instructions by using a conversion rule 146 or a conversion rule 147. The conversion rules 146 and 147 are stored in the control information storage unit 143.

The pattern 145 includes four instructions in an assembly code format or a pseudo assembly code format. The first instruction is an instruction cmp for comparing the variable c with an integer T1. The second instruction is an instruction beq for determining whether to jump on the basis of the comparison result obtained from the first instruction cmp. The third instruction is an instruction cmp for comparing the variable c with an integer T2. The fourth instruction is an instruction beq for determining whether to jump on the basis of the comparison result obtained from the third instruction cmp. Namely, the pattern 145 includes two consecutive sets of branch processing, each of which includes a comparison instruction and a branch instruction. Both the branch instructions indicate the same jump destination, and whether to jump is determined on the basis of the result of each comparison between integers.

The conversion rule 146 includes eight instructions in an assembly code format or a pseudo assembly code format. These eight instructions include processor-architecture-dependent logical instructions and arithmetic instructions that use values in the status register 26.

The first instruction is an instruction xor for calculating exclusive OR of the variable c and the integer T1. If c=T1, the CPU 20 sets 0 as the result of the instruction xor stored in a register r1. The second instruction is an instruction xor for calculating exclusive OR of the variable c and the integer T2. If c=T2, the CPU 20 sets 0 as the result of the instruction xor stored in a register r2.

The third instruction is an instruction subcc for calculating 0-r1. If r1=0 (c=T1), the CPU 20 sets the carry flag to OFF. Otherwise, the CPU 20 sets the carry flag to ON. The fourth instruction is an instruction subx for calculating 0-(−1). If the carry flag is OFF (c=T1), the CPU 20 sets 1 as the result of the instruction subx stored in a register r3. If the carry flag is ON (if c is not equal to T1), the CPU 20 sets 0 in the register r3. The fifth instruction is an instruction subcc for calculating 0-r2. If r2=0 (c=T2), the CPU 20 sets the carry flag to OFF. Otherwise, the CPU 20 sets the carry flag to ON. The sixth instruction is an instruction subx for calculating 0-(−1). If the carry flag is OFF (if c=T2), the CPU 20 sets 1 as the result of the instruction subx stored in a register r4. If the carry flag is ON (if c is not equal to T2), the CPU 20 sets 0 in the register r4.

The seventh instruction is an instruction orcc for calculating logical OR of the value in the register r3 and the value in the register r4. If r3=1 or r4=1 (c=T1 or c=T2), the CPU 20 sets the zero flag to OFF. If r3=0 and r4=0 (if c is not equal to T1 and if c is not equal to T2), the CPU 20 sets the zero flag to ON. The eighth instruction is an instruction bne for jumping, if the zero flag is OFF (c=T1 or c=T2), to the label A indicated in the pattern 145.

While the pattern 145 includes two branch instructions, the conversion rule 146 includes one branch instruction. By converting the code in accordance with the conversion rule 146, the number of branch instructions is reduced by half. However, while the pattern 145 includes a total of four instructions, the conversion rule 146 includes a total of eight instructions. By converting the code in accordance with the conversion rule 146, the total number of instructions is doubled. In general, branch instructions could cause wait time for a subsequent instruction to be fed and a penalty for a branch prediction error. Namely, since the utilization rate of the pipeline processing is decreased, the execution time of a branch instruction tends to be extended compared to other types of instruction. However, whether the execution time of a converted code is shorter than that of the corresponding original code depends on the processor architecture.

The conversion rule 147 includes eight instructions in an assembly code format or a pseudo assembly code format. The first to third and fifth instructions are the same as those in the conversion rule 146.

The fourth instruction is an instruction addx for calculating 0+0. If the carry flag is OFF (if c=T1), the CPU 20 sets 0 as the result of the instruction addx stored in the register r3. If the carry flag is ON (if c is not equal to T1), the CPU 20 sets 1 in the register r3. Likewise, the sixth instruction is an instruction addx for calculating 0+0. If the carry flag is OFF (if c=T2), the CPU 20 sets 0 as the result of the instruction addx stored in the register r4. If the carry flag is ON (if c is not equal to T2), the CPU 20 sets 1 in the register r4.

The seventh instruction is an instruction andcc for calculating logical AND of the value in the register r3 and the value in the register r4. If r3=0 or r4=0 (c=T1 or c=T2), the CPU 20 sets the zero flag to ON. If r3=1 and r4=1 (if c is not equal to T1 and if c is not equal to T2), the CPU 20 sets the zero flag to OFF. The eighth instruction is an instruction beq for jumping, if the zero flag is ON (if c=T1 or c=T2), to the label A indicated in the pattern 145.

The conversion rule 147 also reduces the number of branch instructions, as is the case with the conversion rule 146. In addition, by using arithmetic instructions that refer to values in the status register 26 such as the carry flag, the use of the general-purpose registers is reduced, as compared to the use of other general arithmetic instructions that do not refer to such values in the status register 26. Thus, an increase in memory access caused by exhaustion of the general-purpose registers is suppressed, and the impact caused by an increase of logical instructions and arithmetic instructions is suppressed. The conversion rules 146 and 147 are merely examples. The compiling apparatus 100 may use another conversion rule that reduces the number of branch instructions in the pattern 145.

Figure 8:
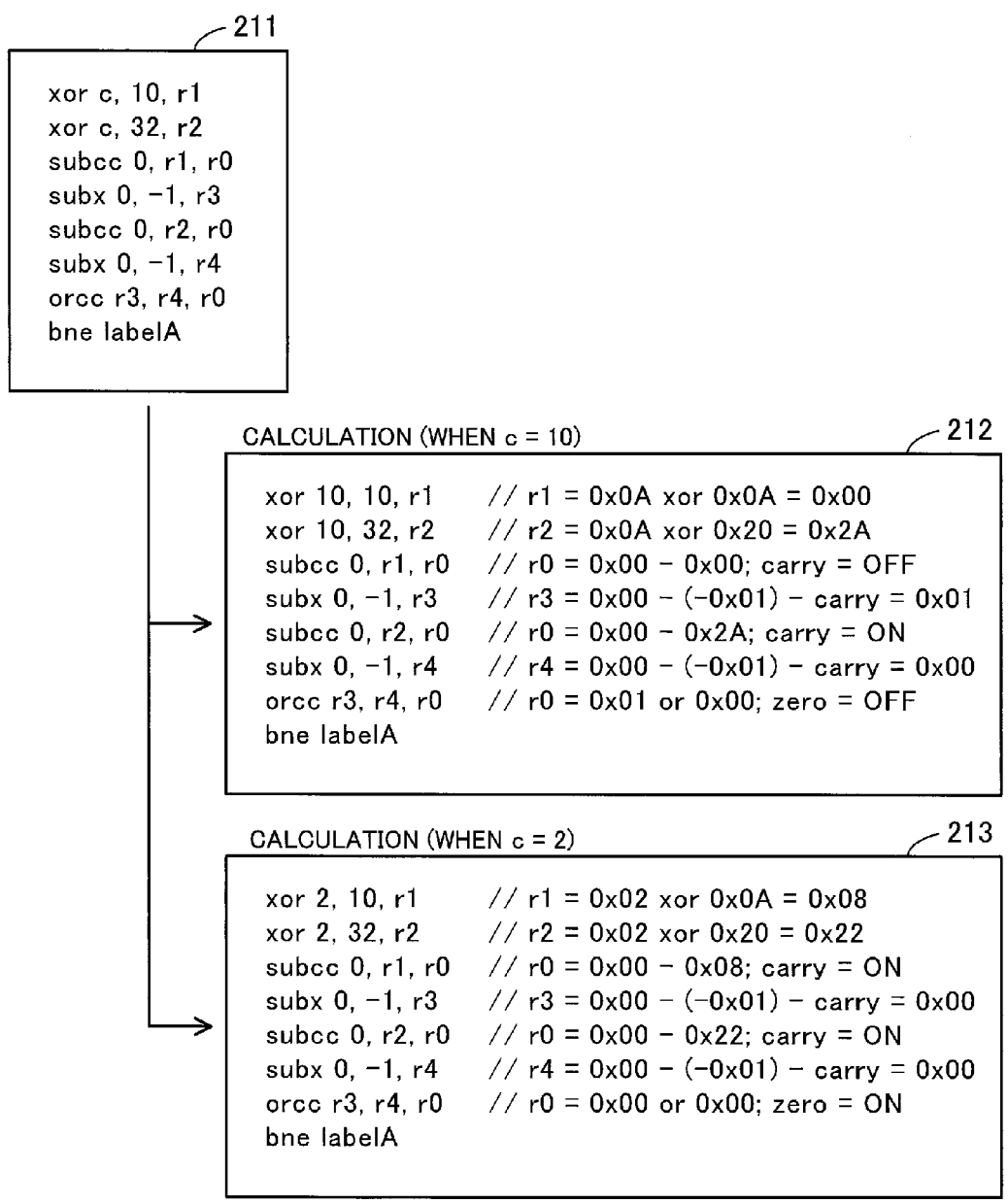
FIG. 8 illustrates exemplary conditional branch calculations on the basis of a converted code.

FIG. 8 illustrates exemplary conditional branch calculations on the basis of a converted code.

In the following description, an example where first four instructions in the code 204 are converted by using the conversion rule 146 will be described. In the generated code 211, integers 10 and 32 are assigned to T1 and T2, which are parameters in the conversion rule 146, respectively.

If c=10, the CPU 20 executes a calculation 212 in accordance with the code 211. In the first instruction xor, since the variable c (=10) matches the parameter T1 (=10), the CPU 20 sets r1=0. In the second instruction xor, since the variable c (=10) does not match the parameter T2 (=32), the CPU 20 sets r2=0x2A. In the third instruction subcc, since r1=0, the CPU 20 sets the carry flag to OFF. In the fourth instruction subx, since the carry flag is OFF, the CPU 20 sets r3=1. In the fifth instruction subcc, since r2=0x2A, the CPU 20 sets the carry flag to ON. In the sixth instruction subx, since the carry flag is ON, the CPU 20 sets r4=0. In the seventh instruction orcc, since r3=1 and r4=0, the CPU 20 sets the zero flag to OFF. In the eighth instruction bne, since the zero flag is OFF, a jump to label A occurs. This calculation 212 represents the same operation as the original code including two instructions cmp and two instructions beq.

In contrast, if c=2, the CPU 20 executes a calculation 213 in accordance with the code 211. In the first instruction xor, since the variable c (=2) does not match the parameter T1 (=10), the CPU 20 sets r1=0x08. In the second instruction xor, since the variable c (=2) does not match the parameter T2 (=32), the CPU 20 sets r2=0x22. In the third instruction subcc, since r1=0x08, the CPU 20 sets the carry flag to ON. In the fourth instruction subx, since the carry flag is ON, the CPU 20 sets r3=0. In the fifth instruction subcc, since r2=0x22, the CPU 20 sets the carry flag to ON. In the sixth instruction subx, since the carry flag is ON, the CPU 20 sets r4=0. In the seventh instruction orcc, since r3=0 and r4=0, the CPU 20 sets the zero flag to ON. In the eighth instruction bne, since the zero flag is ON, a jump to label A does not occur. This calculation 213 represents the same operation as the original code including two instructions cmp and two instructions beq.

Figure 9:
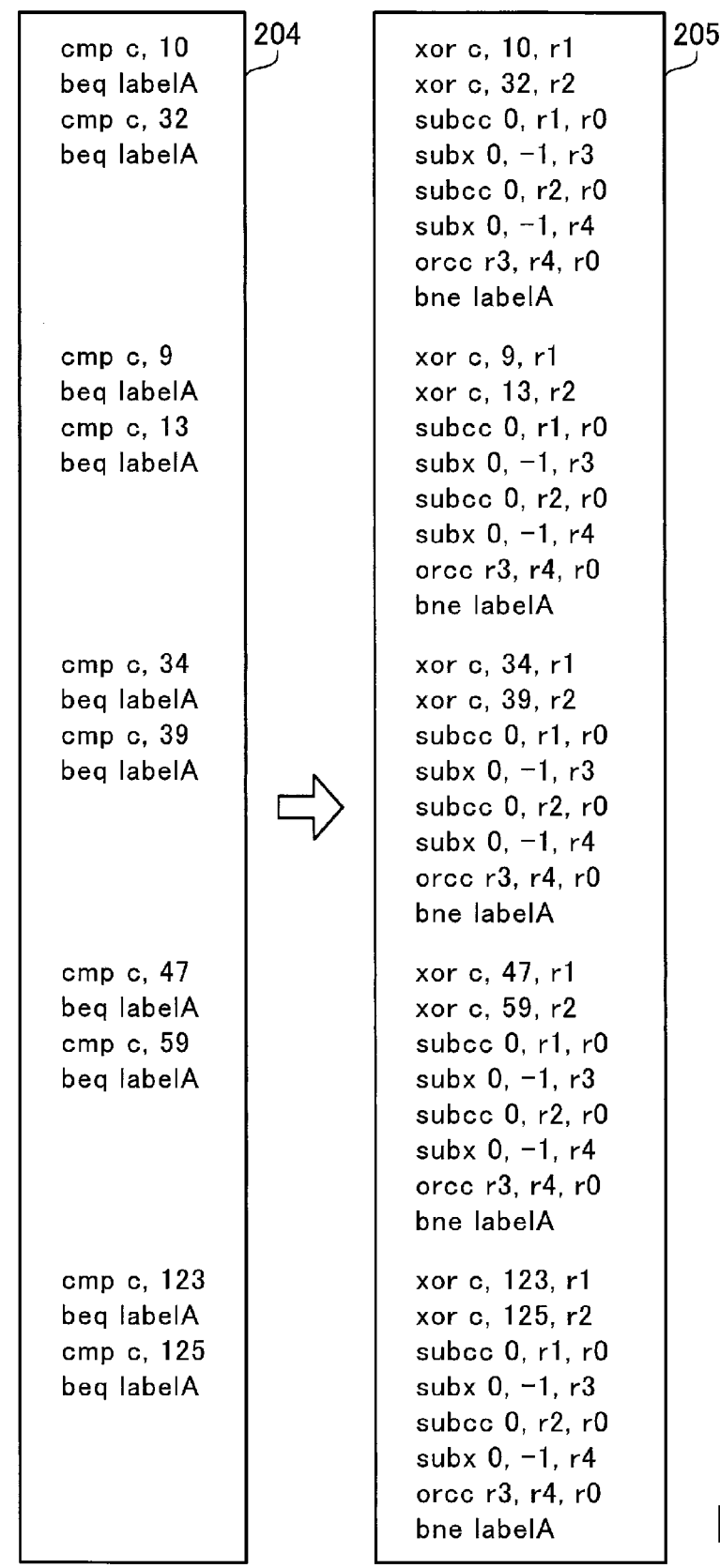
FIG. 9 illustrates exemplary conversion of a code including consecutive branch instructions.

FIG. 9 illustrates exemplary conversion of a code including consecutive branch instructions.

The compiling apparatus 100 applies the conversion rule 146 to groups of instructions, each group including two comparison instructions and two branch instructions in the code 204, when converting the code 204 into a code 205. Eight consecutive instructions in the code 205 are generated from four consecutive instructions in the code 204. Namely, while the code 204 has 20 instructions including 10 branch instructions, the code 205 has 40 instructions including five branch instructions.

Whether the execution time of the code 205 is shorter than that of the code 204 depends on the processor architecture. Therefore, the compiling apparatus 100 estimates the cycle numbers for the respective codes 204 and 205 on the basis of the cycle numbers listed in the processor information 144. The compiling apparatus 100 adopts the code that needs fewer cycles.

The processor information 144 indicates that the instruction cmp needs 1 cycle and the instruction beq needs 10 cycles. Thus, a total number of cycles needed for the code 204 is 110 ((1×1 com+10×1 beq)×10). In contrast, the instructions xor, subcc, subx, and orcc needs 1 cycle, respectively, and the instruction bne needs 10 cycles. Thus, a total number of cycles needed for the code 205 is 85 ((1×2 xor+1×2 subcc+ 1×2 subx+1×1 orcc+10×1 bne)×5). Since the number of cycles needed for the code 205 is smaller than that needed for the code 204, the compiling apparatus 100 adopts the optimization that converts the code 204 into the code 205.

Figure 10:
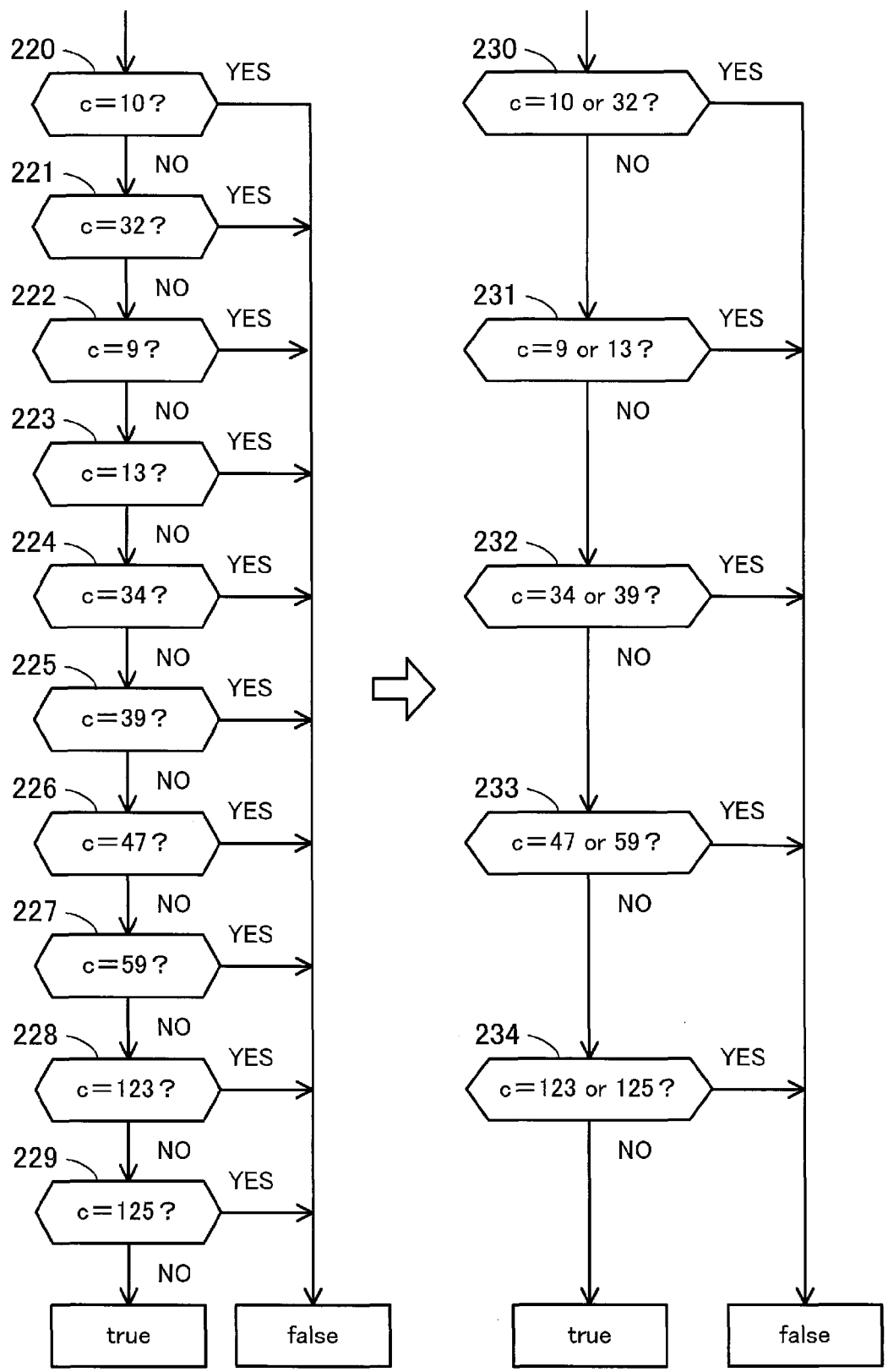
FIG. 10 illustrates exemplary control structures for conditional branches before and after conversion.

FIG. 10 illustrates exemplary control structures for conditional branches before and after the conversion.

When executing the code 204, the CPU 20 sequentially executes branch processing 220 to 229 at most. If c=10 in the branch processing 220, the processing jumps to processing for setting a return value to false. Otherwise, the processing proceeds to the branch processing 221. If c=32 in the branch processing 221, the processing jumps to processing for setting a return value to false. Otherwise, the processing proceeds to the branch processing 222. If c=9 in the branch processing 222, the processing jumps to processing for setting a return value to false. Otherwise, the processing proceeds to the branch processing 223. If c=13 in the branch processing 223, the processing jumps to processing for setting a return value to false. Otherwise, the processing proceeds to the branch processing 224. If c=34 in the branch processing 224, the processing jumps to processing for setting a return value to false. Otherwise, the processing proceeds to the branch processing 225.

If c=39 in the branch processing 225, the processing jumps to processing for setting a return value to false. Otherwise, the processing proceeds to the branch processing 226. If c=47 in the branch processing 226, the processing jumps to processing for setting a return value to false. Otherwise, the processing proceeds to the branch processing 227. If c=59 in the branch processing 227, the processing jumps to processing for setting a return value to false. Otherwise, the processing proceeds to the branch processing 228. If c=123 in the branch processing 228, the processing jumps to processing for setting a return value to false. Otherwise, the processing proceeds to the branch processing 229. If c=125 in the branch processing 229, the processing jumps to processing for setting a return value to false. Otherwise, the processing proceeds to processing for setting a return value to true.

When executing the code 205, the CPU 20 sequentially executes branch processing 230 to 234 at most. If c=10 or c=32 in the branch processing 230, the processing jumps to processing for setting a return value to false. Otherwise, the processing proceeds to the branch processing 231. If c=9 or c=13 in the branch processing 231, the processing jumps to processing for setting a return value to false. Otherwise, the processing proceeds to the branch processing 232. If c=34 or c=39 in the branch processing 232, the processing jumps to processing for setting a return value to false. Otherwise, the processing proceeds to the branch processing 233. If c=47 or c=59 in the branch processing 233, the processing jumps to processing for setting a return value to false. Otherwise, the processing proceeds to the branch processing 234. If c=123 or c=125 in the branch processing 234, the processing jumps to processing for setting a return value to false. Otherwise, the processing proceeds to processing for setting a return value to true.

When the optimization for reducing the number of branch instructions is performed in this way, instead of executing one branch instruction for every comparison value, the CPU 20 executes one branch instruction for every two consecutive comparison values. While one branch instruction is executed for every two comparison values according to the second embodiment, one branch instruction may be executed for every three or more comparison values.

However, when the CPU 20 executes one branch instruction for every n comparison values (n is an integer 2 or more), even if the variable c matches the first comparison value, an operation(s) on the remaining comparison value(s) (the n−1 comparison value(s)) is executed. More specifically, when the original code 204 is used, part of a comparison operation could be omitted. However, such omission is not performed when the code 205 is used, which may result in an increase in execution time. Thus, in view of such increase in execution time that could be caused, an appropriate value needs to be set as the value n. When n=2, the execution time for branch processing is suitably reduced in many cases. The compiling apparatus 100 may dynamically determine the value n in view of the probability that the variable c matches any one of the comparison values listed.

Next, a compiling procedure performed by the compiling apparatus 100 will be described.

Figure 11:
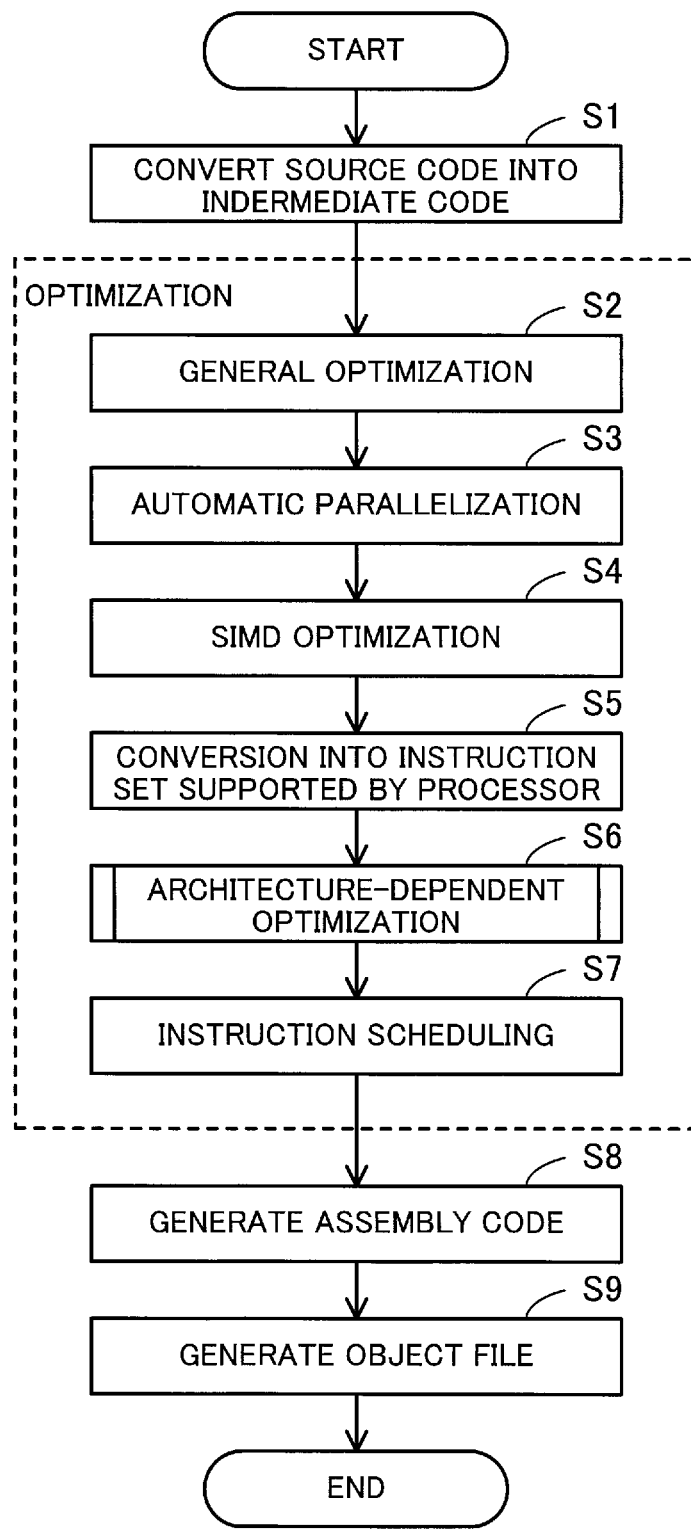
FIG. 11 is a flowchart illustrating an exemplary compiling procedure.

FIG. 11 is a flowchart illustrating an exemplary compiling procedure.

(S1) The intermediate code generation unit 133 analyzes a source code read from the source file 121, converts the source code into an intermediate code, and stores the intermediate code in the intermediate code storage unit 134. Examples of the analysis of the source code include a lexical analysis, a syntax analysis, and a semantic analysis.

(S2) The optimization unit 140 executes general optimization on the intermediate code stored in the intermediate code storage unit 134 and rewrites the intermediate code. The general optimization includes, for example, deletion of unused variables, conversion of mathematical expressions that only depend on statically-determined values into constant expressions, and reuse of calculation results of common sub-expressions shared in a plurality of mathematical expressions.

(S3) The optimization unit 140 detects instructions that are independent and executable in parallel in the intermediate code and rewrites the intermediate code so that the detected instructions are executed in parallel. The parallelization includes expanding (unrolling) instructions in a loop and parallelizing i-th processing (i is an integer 1 or more) and (i+1)th processing of the original loop.

(S4) If the target processor supports single instruction multiple data (SIMD) instructions, the optimization unit 140 detects two or more scalar instructions that are independent and that indicate the same type of operations in the intermediate code and converts the detected instructions into SIMD instructions. An SIDM instruction is an instruction for executing the same operation on two or more sets of data in parallel.

(S5) The optimization unit 140 rewrites the instruction format used in the intermediate code to an instruction format used in an instruction set supported by the target processor. Namely, the optimization unit 140 rewrites the intermediate code independent of the processor to an intermediate code dependent on the processor. The user may specify the target processor at the time of compiling. In such case, the optimization unit 140 may refer to processor information corresponding to the specified processor.

(S6) If the execution time is reduced by using processor-architecture-dependent instructions, the optimization unit 140 executes processor-architecture-dependent optimization. The processor-architecture-dependent optimization includes branch instruction reduction performed by using the instruction group illustrated in FIG. 5.

(S7) The optimization unit 140 rewrites the intermediate code by changing the execution sequence of the instructions included in the intermediate code so that the parallelism and the utilization rate of the pipeline processing is improved.

(S8) The assembly code generation unit 135 generates an assembly code that corresponds to machine language instructions from the intermediate code stored in the intermediate code storage unit 134.

(S9) The file output unit 136 generates and stores the object file 122 in the file storage unit 120. The file output unit 136 converts the assembly code generated in step S8 into a machine-readable object code and writes the generated object code in the object file 122. The linker 150 links the object file 122 with other object files or libraries and converts the object file 122 into the executable file 123.

Figure 12:
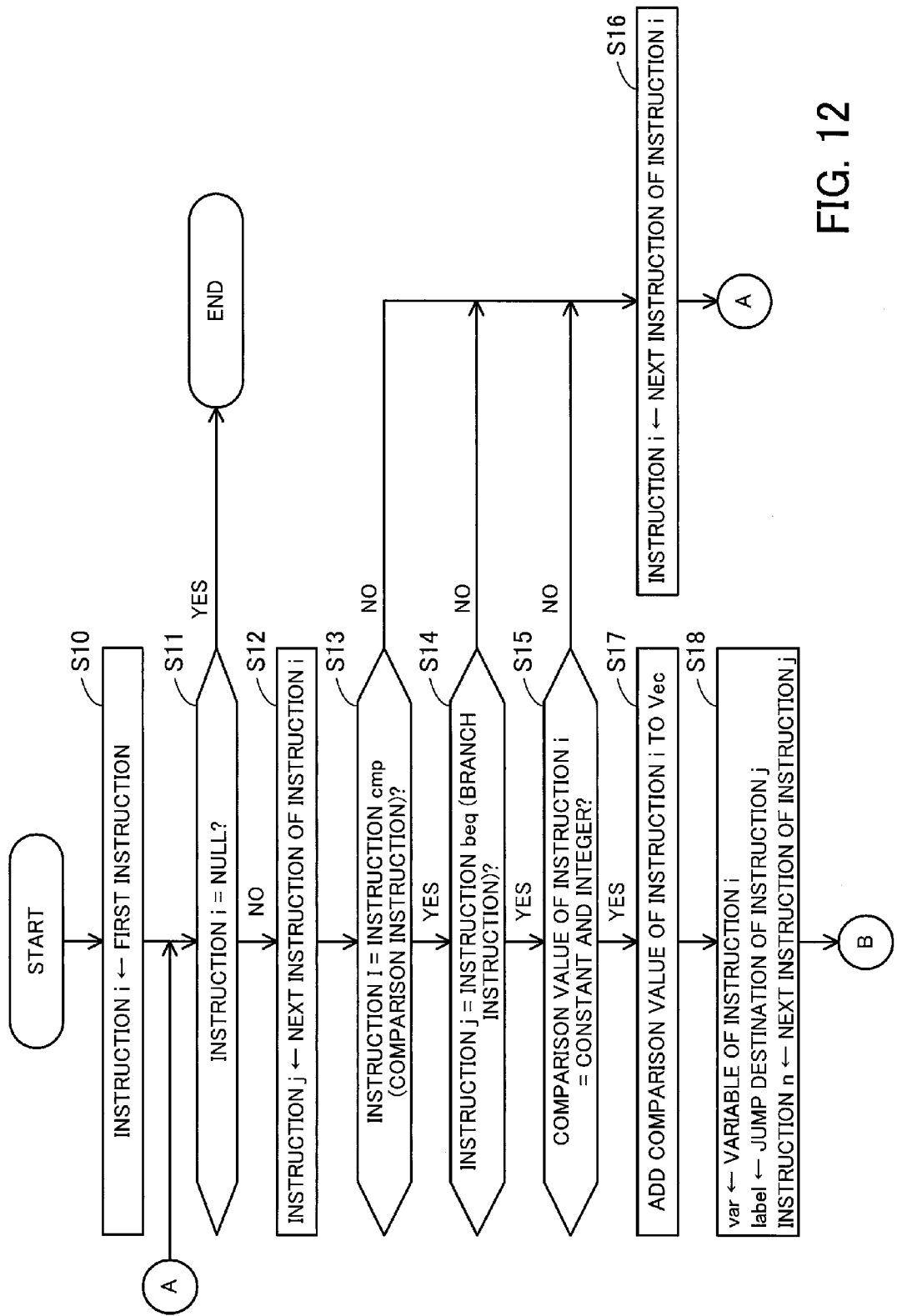
FIG. 12 is a flowchart illustrating an exemplary procedure for reducing the number of branch instructions.

FIG. 12 is a flowchart illustrating an exemplary procedure for reducing the number of branch instructions.

The processing illustrated in this flowchart is executed in step S6 described above.

(S10) The analysis unit 141 selects the first instruction in the intermediate code as an instruction i.

(S11) The analysis unit 141 determines whether the instruction i is NULL (does not exist). If the instruction i is NULL, the optimization is ended. Otherwise, the processing proceeds to step S12.

(S12) The analysis unit 141 selects the next instruction of the instruction i as an instruction j.

(S13) The analysis unit 141 checks the type of the instruction i and determines whether the instruction i is an instruction cmp (comparison instruction). If the instruction i is an instruction cmp, the processing proceeds to step S14. Otherwise, the processing proceeds to step S16.

(S14) The analysis unit 141 checks the type of the instruction j (the next instruction of the instruction cmp) and determines whether the instruction j is an instruction beq (branch instruction). If the instruction j is an instruction beq, the processing proceeds to step S15. Otherwise, the processing proceeds to step S16.

(S15) The analysis unit 141 determines whether a comparison value specified as the second operand of the instruction i (instruction cmp) is a constant and an integer. If the comparison value is a constant and an integer, the processing proceeds to step S17. Otherwise, the processing proceeds to step S16.

(S16) The analysis unit 141 selects the next instruction of the current instruction i as a new instruction i from the intermediate code. Next, the processing proceeds to step S11.

(S17) The analysis unit 141 adds the comparison value of the instruction i to the end of a comparison value array Vec. The comparison value array Vec is a variable-length array (vector) stored in the RAM 102.

(S18) The analysis unit 141 sets a variable specified as the first operand of the instruction i (instruction cmp) as var, sets the jump destination of the instruction j (instruction beq) as label, and sets the next instruction of the instruction j as an instruction n. Next, the processing proceeds to step S19.

Figure 13:
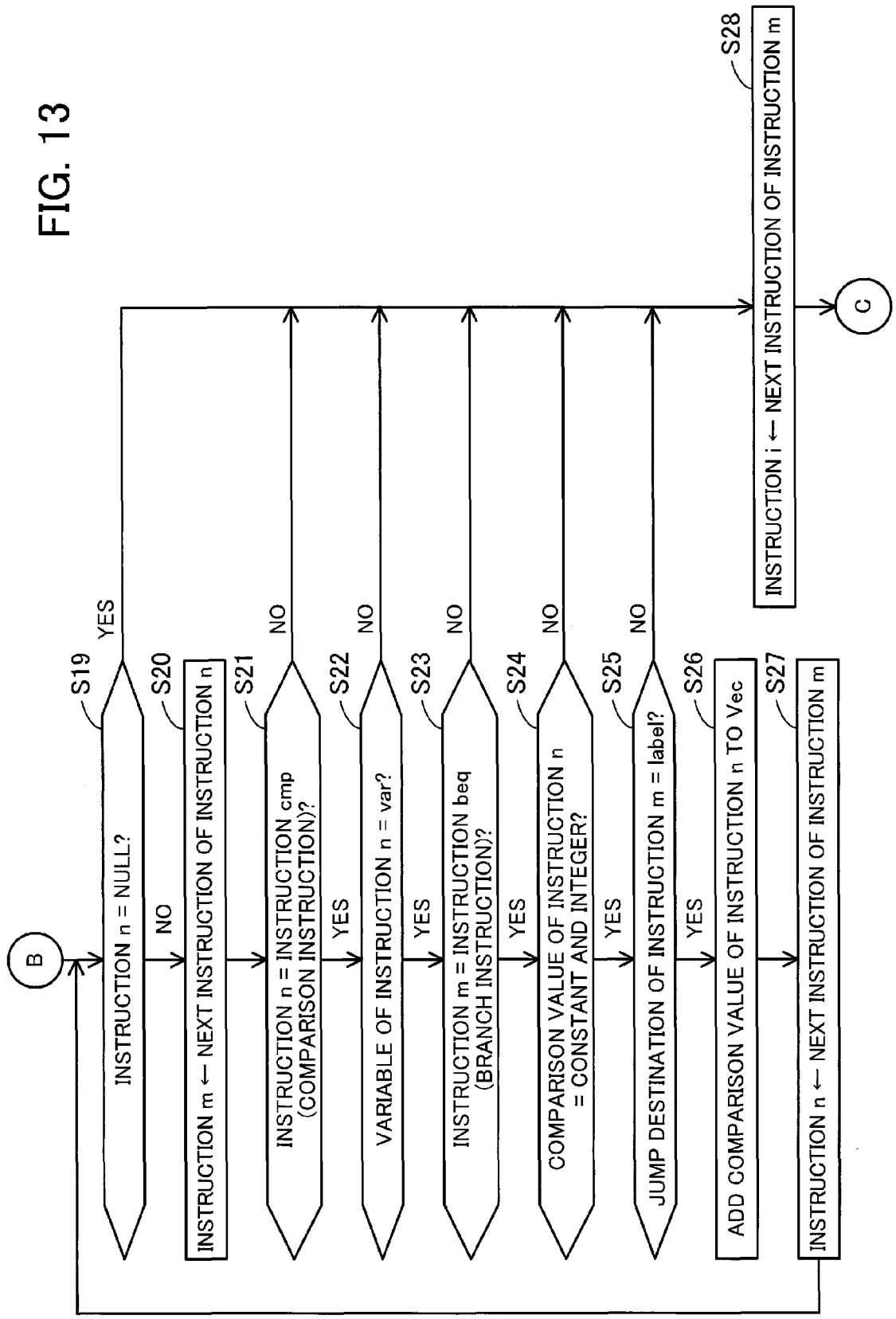
FIG. 13 is another flowchart illustrating the exemplary procedure for reducing the number of branch instructions.

FIG. 13 is another flowchart illustrating the exemplary procedure for reducing the number of branch instructions.

(S19) The analysis unit 141 determines whether the instruction n is NULL. If the instruction n is NULL, the processing proceeds to step S28. Otherwise, the processing proceeds to step S20.

(S20) The analysis unit 141 selects the next instruction of the instruction n as an instruction m.

(S21) The analysis unit 141 checks the type of the instruction n and determines whether the instruction n is an instruction cmp (comparison instruction). If the instruction n is an instruction cmp, the processing proceeds to step S22. Otherwise, the processing proceeds to step S28.

(S22) The analysis unit 141 determines whether a variable specified as the first operand of the instruction n (instruction cmp) matches var (the variable of the instruction i). If the variable matches var, the processing proceeds to step S23. Otherwise, the processing proceeds to step S28.

(S23) The analysis unit 141 checks the type of the instruction m (the next instruction of the instruction cmp) and determines whether the instruction m is an instruction beq (branch instruction). If the instruction m is an instruction beq, the processing proceeds to step S24. Otherwise, the processing proceeds to step S28.

(S24) The analysis unit 141 determines whether a comparison value specified as the second operand of the instruction n (instruction cmp) is a constant and an integer. If the comparison value is a constant and an integer, the processing proceeds to step S25. Otherwise, the processing proceeds to step S28.

(S25) The analysis unit 141 determines whether the jump destination specified as an operand of the instruction m (instruction beq) matches label (the jump destination of the instruction j). If the jump destination matches label, the processing proceeds to step S26. Otherwise, the processing proceeds to step S28.

(S26) The analysis unit 141 adds the comparison value of the instruction n to the end of the comparison value array Vec.

(S27) The analysis unit 141 selects the next instruction of the current instruction m as a new instruction n from the intermediate code. Next, the processing proceeds to step S19.

(S28) The analysis unit 141 selects the next instruction of the current instruction m as a new instruction i from the intermediate code. Next, the processing proceeds to step S29.

Figure 14:
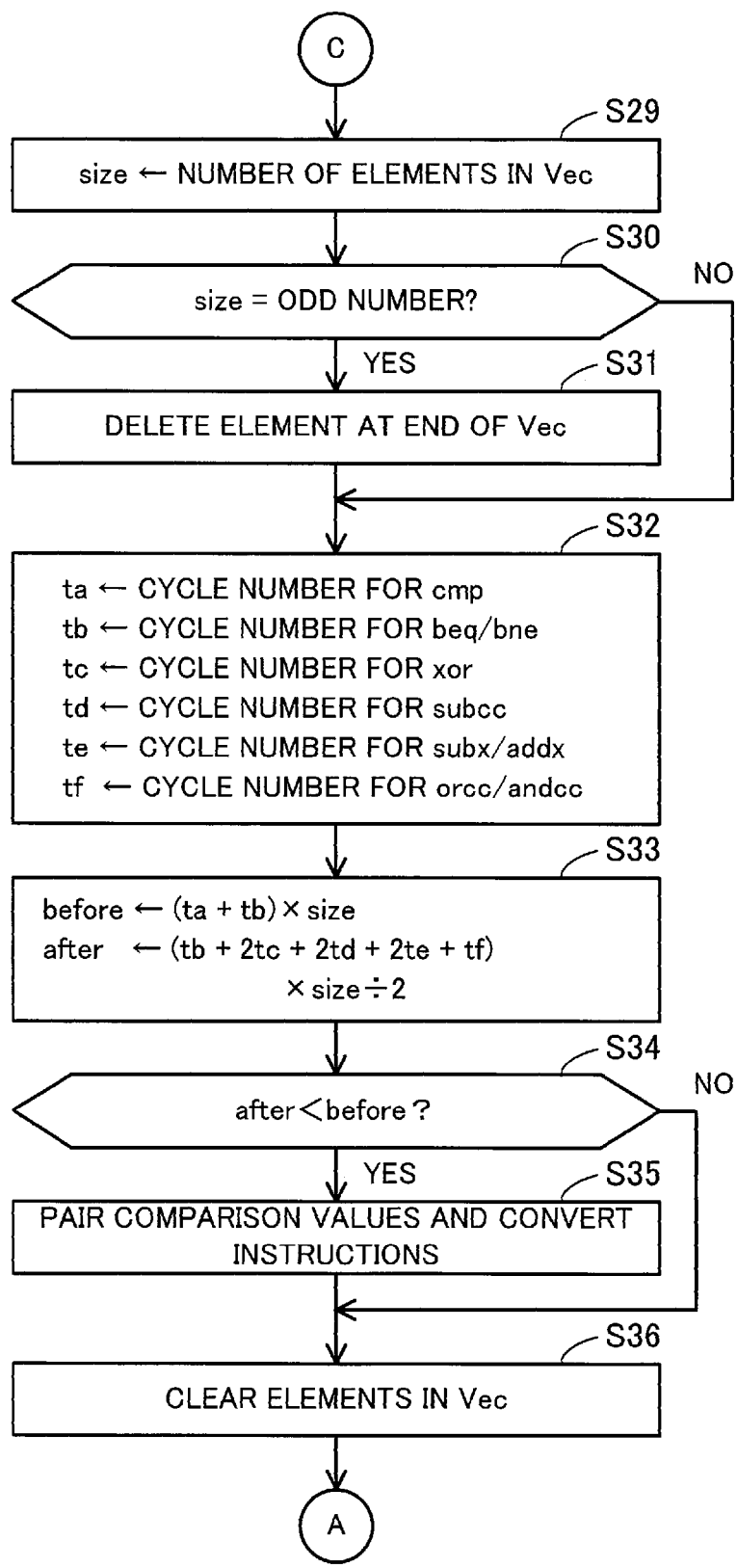
FIG. 14 is a still another flowchart illustrating the exemplary procedure for reducing the number of branch instructions.

FIG. 14 is a still another flowchart illustrating the exemplary procedure for reducing the number of branch instructions.

(S29) The analysis unit 141 sets the number of elements in the comparison value array Vec as "size."

(S30) The analysis unit 141 determines whether this size is an odd number. If the size is an odd number, the processing proceeds to step S31. Otherwise, the processing proceeds to step S32.

(S31) The analysis unit 141 deletes an element located at the end of the comparison value array Vec so that the size is changed to an even number. An instruction cmp having a comparison value deleted is excluded from the optimization target.

(S32) The analysis unit 141 refers to the processor information 144 stored in the control information storage unit 143. If processor information about a plurality of processor architectures is stored in the control information storage unit 143, the analysis unit 141 refers to processor information corresponding to the processor specified by the user. The number of cycles needed for an instruction cmp is set as ta, the number of cycles needed for instructions beq/bne is set as tb, the number of cycles needed for an instruction xor is set as tc, the number of cycles needed for an instruction subcc is set as td, the number of cycles needed for instructions subx/addx is set as te, and the number of cycles needed for instructions orcc/andcc is set as tf.

(S33) The analysis unit 141 calculates "before" and "after" representing the numbers of cycles needed before and after the optimization is executed, respectively, for the branch processing in the range of comparison values stored in the comparison value array Vec. The cycle number "before" is calculated by (ta+tb)×size, and the cycle number "after" is calculated by (tb+2tc+2td+2te+tf)×size÷2.

(S34) The analysis unit 141 determines whether the cycle number "after" is smaller than the cycle number "before," namely, whether the execution time is reduced by the optimization. If the cycle number "after" is smaller than the cycle number "before," the processing proceeds to step S35. Otherwise, the processing proceeds to step S36.

(S35) The analysis unit 141 determines to execute the optimization for reducing the number of branch instructions. The optimization execution unit 142 extracts the elements (the comparison values stored in the comparison value array Vec) from the comparison value array Vec and pairs the elements from the top. Next, the optimization execution unit 142 generates an optimized intermediate code by applying the conversion rule 146 stored in the control information storage unit 143.

(S36) The analysis unit 141 deletes all the comparison values stored in the comparison value array Vec (clears all the elements in the comparison value array Vec). Next, the processing proceeds to step S11.

In this way, the analysis unit 141 detects a branch-processing-related instruction group satisfying the predetermined conditions in the intermediate code. The detected instruction group is a group of consecutive instructions satisfying the following conditions. (1) An instruction cmp (comparison instruction) and an instruction beq (branch instruction) are alternated in sequence. (2) The same variable is specified as the first operand of each instruction cmp. (3) The comparison value specified as the second operand of each instruction cmp is a constant and an integer. (4) The same jump destination is specified as an operand of each instruction beq. The optimization execution unit 142 reduces the number of branch instructions by applying processor-architecture-dependent logical and arithmetic instructions such as subcc, subx, and orcc to each detected instruction group.

FIG. 15 is an exemplary table illustrating a comparison value array.

The analysis unit 141 generates a comparison value array 148 when executing the optimization for reducing the number of branch instructions. The comparison value array 148 includes columns for "Index" and "Comparison value." In an entry under the column "Index," an identification number for identifying an element in the comparison value array 148 is indicated. In an entry under the column "Comparison value," an integer specified as the second operand of an instruction cmp is indicated. When the analysis unit 141 analyzes the code 204, the comparison values 10, 32, 9, 13, 34, 39, 47, 59, 123, and 125 are stored in the comparison value array 148 in this order.

As illustrated in FIG. 10, whether the original code 204 or the converted code 205 is processed, branch processing on a plurality of comparison values is performed consecutively in an order determined at the time of compiling. If the variable c matches a comparison value at an early stage of the processing, the branch processing on the remaining comparison values is omitted. For example, in the flow illustrated in FIG. 10, if c=32, the branch processing on 9, 13, 34, 39, 47, 59, 123, and 125 is omitted.

In view of this, it is preferable that branch processing on a comparison value having a higher appearance rate be executed earlier. In one method for realizing such branch processing, the CPU 20 is caused to tentatively execute an object code that has not been optimized, to collect execution information indicating, for example, the number of times each instruction has been executed. Next, the compiling apparatus 100 changes the order of the comparison values by referring to the execution information.

FIG. 16 is an exemplary table illustrating execution information.

Execution information 149 is information that is collected when the CPU 20 has executed an object code corresponding to the code 204. The execution information 149 includes columns for "Comparison value," "Number of Jumps," and "Rate." An entry under the column "Comparison value" indicates a fixed integer specified as the second operand of an instruction cmp (comparison instruction) in the code 204. An entry under the column "Number of jumps" indicates the number of times that a jump has occurred by an instruction beq (branch instruction) immediately after an instruction cmp having a corresponding comparison value. An entry under the column "Rate" indicates the rate of the number of jumps corresponding to a comparison value with respect to the total number of jumps listed in the execution information 149.

In FIG. 16, c=10 accounts for 1.5%, c=32 accounts for 2.5%, c=9 accounts for 21.0%, c=13 accounts for 5.0%, c=34 accounts for 3.0%, c=39 accounts for 19.0%, c=47 accounts for 22.0%, c=59 accounts for 5.5%, c=123 accounts for 19.5%, and c=125 accounts for 1.0%. In optimization processing, the optimization unit 140 in the compiling apparatus 100 may change the order of the comparison values by referring to the execution information 149 so that fewer branch instructions are executed.

Figure 17:
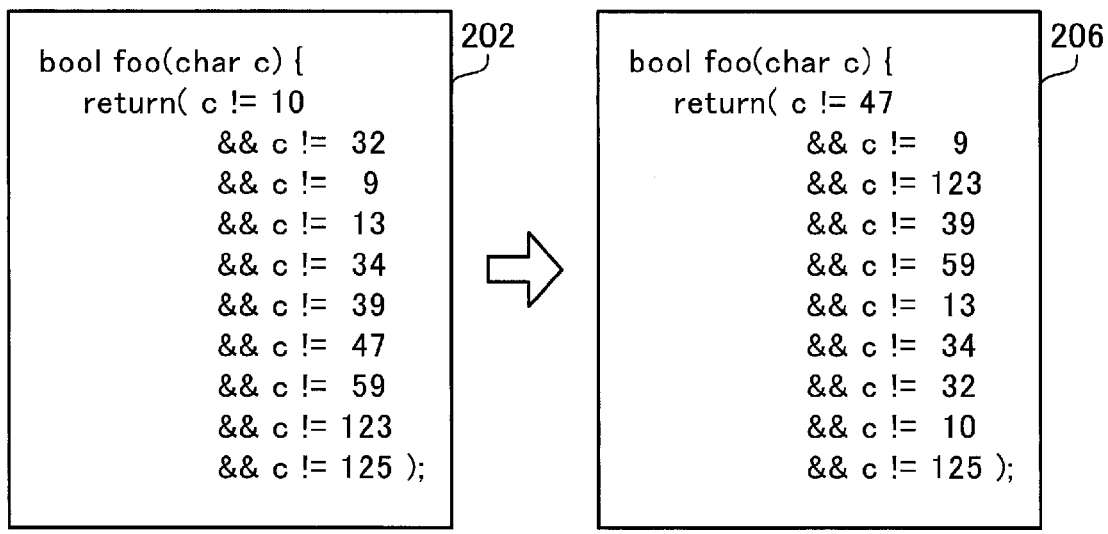
FIG. 17 illustrates another exemplary conversion of a code including consecutive branch instructions.

FIG. 17 illustrates another exemplary conversion of a code including consecutive branch instructions. By referring to the execution information 149, the order of the comparison values is changed in descending order of the appearance rate as follows: 47, 9, 123, 39, 59, 13, 34, 32, 10, and 125. Next, the optimization unit 140 converts the code 202 into a code 206, for example. In the code 206, the ten comparison values are arranged in descending order of the appearance rate. In this way, the number of branch instructions that is actually executed is reduced, and the execution time is shortened.

Changing the order of the comparison values may be executed in combination with the branch instruction reduction performed by using processor-architecture-dependent logical and arithmetic instructions. In a case where only one of these two optimization methods is executed, the latter optimization has the following advantageous effects compared to the former optimization. (1) Even when the appearance rates are not very different among a plurality of comparison values or the possibility that an input value does not match any one of the comparison values is high, the execution time is still reduced effectively. (2) Optimization of branch processing is possible without collecting the execution information 149. This advantageous effect is particularly significant when a program that needs a large amount of calculation is used. (3) No compiling is needed more than once. This advantageous effect is significant when a complex program that needs an extended period of time for compiling is used.

According to the second embodiment, the compiling apparatus 100 reduces the number of branch instructions included in an object code. As a result, wait time for a subsequent instruction to be fed into the pipeline processing and occurrence of a penalty caused by a branch prediction error are suppressed. Thus, object code execution efficiency is improved. In particular, a processor that is less accurate in branch prediction achieves a significant improvement in its execution efficiency. In addition, by estimating the number of cycles needed for the original code and that needed for the converted code, whether the execution time is reduced by the conversion is determined. Thus, optimization that increases the number of instructions is possible. In addition, by using processor-architecture-dependent arithmetic instructions using values in the status register 26, the use of the general-purpose registers is reduced. Thus, the impact caused by an increase of logical and arithmetic instructions is suppressed.

As described above, the information processing according to the first embodiment is realized by causing the compiling apparatus 10 to execute a program. The information processing according to the second embodiment is realized by causing the compiling apparatus 100 to execute a program.

Each of these programs may be recorded in a computer-readable recording medium (for example, the recording medium 113). Examples of the recording medium include a magnetic disk, an optical disc, an MO disc, and a semiconductor memory. Examples of the magnetic disk include an FD and an HDD. Examples of the optical disk include a CD, a CD-R (Recordable)/RW (Rewritable), a DVD, and a DVD-R/RW. The program may be recorded in a portable recording medium and distributed. In such case, the program may be executed after being copied (installed) from the portable recording medium onto another recording medium such as an HDD (for example, the HDD 103).

According to one aspect, the efficiency of branch processing performed by a processor is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing a computer program that causes a computer to perform a procedure comprising:
   detecting a plurality of branch instructions, each of which specifies execution of branch processing on the basis of a result of a comparison operation between integers and indicates the same jump destination, in a first code;
   converting a first instruction group including the plurality of branch instructions in the first code into a second instruction group having fewer branch instructions than the first instruction group by using logical and arithmetic instructions, the converted second instruction group having a greater number of instructions than the first instruction group; and
   generating a second code using the converted second instruction group when the number of cycles of processing based on the converted second instruction group is smaller than that based on the first instruction group.

2. The non-transitory computer-readable recording medium according to claim 1,
   wherein, at least one of the logical and arithmetic instructions is a processor-dependent instruction that refers to a flag stored in a status register.

3. The non-transitory computer-readable recording medium according to claim 1,
   wherein the plurality of branch instructions includes: a first branch instruction in which whether to jump to the jump destination is determined on the basis of a result of a comparison between an input value and a first integer; and a second branch instruction in which whether to jump to the jump destination is determined on the basis of a result of a comparison between the input value and a second integer, and
   wherein the converted second instruction group includes a third branch instruction in which whether to jump to the jump destination is determined on the basis of a determination value calculated from the input value, the first integer, and the second integer.

4. A compiling method, comprising:
   detecting, by a processor, a plurality of branch instructions, each of which specifies execution of branch processing on the basis of a result of a comparison operation between integers and indicates the same jump destination, in a first code;
   converting, by the processor, a first instruction group including the plurality of branch instructions in the first code into a second instruction group having fewer branch instructions than the first instruction group by using logical and arithmetic instructions, the converted second instruction group having a greater number of instructions than the first instruction group; and
   generating, by the processor, a second code using the converted second instruction group when the number of cycles of processing based on the converted second instruction group is smaller than that based on the first instruction group.

5. A compiling apparatus, comprising:
   a memory configured to store a first code including a plurality of branch instructions each of which specifies execution of branch processing on the basis of a result of a comparison operation between integers and indicates the same jump destination; and
   a processor configured to perform a procedure including:
   converting a first instruction group including the plurality of branch instructions in the first code into a second instruction group having fewer branch instructions than the first instruction group by using logical and arithmetic instructions, the converted second instruction group having a greater number of instructions than the first instruction group; and
   generating a second code using the converted second instruction group when the number of cycles of processing based on the converted second instruction group is smaller than that based on the first instruction group.

* * * * *